United States Patent [19]

Giles, Jr.

[11] Patent Number: 5,049,323

[45] Date of Patent: Sep. 17, 1991

[54] METHOD FOR THERMOSTAMPING THERMOPLASTIC COMPOSITES

[75] Inventor: Harold F. Giles, Jr., Shelby, N.C.

[73] Assignee: General Electric Company, Pittsfield, Mass.

[21] Appl. No.: 499,121

[22] Filed: Mar. 26, 1990

[51] Int. Cl.⁵ .............................................. B29C 35/12
[52] U.S. Cl. ...................................... 264/25; 264/26; 264/257; 264/322; 425/174.4; 425/174.8 R
[58] Field of Search .................. 264/25, 26, 153, 257, 264/320, 322, 324; 425/174.8 R, 174.4

[56] References Cited

U.S. PATENT DOCUMENTS

| | | |
|---|---|---|
| 2,998,501 | 8/1961 | Edberg et al. . |
| 3,242,238 | 3/1966 | Edberg et al. . |
| 3,621,092 | 11/1971 | Hofer ................................. 264/324 |
| 3,792,141 | 2/1974 | Offutt . |
| 3,850,723 | 11/1974 | Ackley .............................. 264/322 |
| 4,154,893 | 5/1979 | Goldman ........................... 264/173 |
| 4,188,355 | 2/1980 | Graham et al. . |
| 4,288,399 | 9/1981 | Siedenstrang et al. . |
| 4,304,744 | 12/1981 | Stroud ......................... 425/174.8 R |
| 4,423,191 | 12/1983 | Haven et al. ........................ 264/26 |
| 4,675,139 | 6/1987 | Kehe et al. .................. 425/174.8 R |
| 4,790,965 | 12/1988 | Thorsrud ............................. 264/26 |
| 4,840,758 | 6/1989 | Thorsrud ............................. 264/26 |
| 4,921,646 | 5/1990 | Stewart ............................... 264/26 |
| 4,921,647 | 5/1990 | Stewart ............................. 264/153 |

*Primary Examiner*—Jeffery Thurlow
*Attorney, Agent, or Firm*—Spencer D. Conard; William F. Mufatti

[57] ABSTRACT

A method for thermostamping thermoplastic composites involves the steps of (a) convection heating of the composite to the glass transition temperature of the thermoplastic; (b) radio frequency heating of the composite from the glass transition temperature of the thermoplastic to the desired stamping temperature; and (c) stamping of the composite into the desired shaped article. The method provides for improved temperature uniformity throughout the composite prior to stamping thereof resulting in more uniform parts.

11 Claims, No Drawings

METHOD FOR THERMOSTAMPING THERMOPLASTIC COMPOSITES

BACKGROUND OF THE INVENTION

1. Field of the Invention

The present invention relates to methods for thermostamping thermoplastic composites; and, more particularly relates to a method for thermostamping composites involving radio frequency heating of the composite.

2. Description of Related Art

Radio frequency heating of thermoplastic composites in molding processes is known, see for example Thorsrud, U.S. Pat. No. 4,840,758. The molding processes involving radio frequency heating have, however, generally been relatively slow processes.

Convection heating of thermoplastic composites is also known, however, convection heating of composites made from non-woven, compressed, randomly dispersed fiber webs results in melting of the resin at the surface of the composite which allows lofting of the fibers at the composite surface resulting in insulation of the center of the composite thereby resisting heat transfer to the composite's center resulting in uneven heating across the thickness of the composite.

Accordingly, one object of the present invention is to provide a thermostamping method which provides quick heating of the composite with uniform heat distribution therethrough.

SUMMARY OF THE INVENTION

The present invention involves a method of thermostamping thermoplastic composites and comprises (a) convection heating of the composite to the glass transition temperature of the thermoplastic; (b) radio frequency heating of the composite from the glass transition temperature of the thermoplastic to the melt stamping temperature, for example the melt temperature of the thermoplastic; and (c) stamping of the composite into the desired shape.

DETAILED DESCRIPTION OF THE INVENTION

In accordance with the present invention, a method is provided for thermostamping thermoplastic composites involving (a) convection heating of the composite to the glass transition temperature of the thermoplastic; (b) radio frequency heating of the composite from the glass transition temperature of the thermoplastic to the melt stamping temperature, for example the melt temperature of the thermoplastic; and (c) stamping of the composite into the desired shape.

The thermoplastic composites comprise respective amounts of thermoplastic resin; reinforcing fibers and a radio frequency sensitizing agent. The composites are preferably compression consolidated from randomly oriented fibers dispersed in a polymeric matrix. Suitable methods for making the composites are set forth in Gatward et al U.S. Pat. No. 3,716,449 which is incorporated herein by reference. The composites can be made by first using a paper making process to make a liquid dispersion of reinforcing fiber and plastic powder to form a web of randomly oriented fibers dispersed in a plastic powder matrix followed by heat and pressure consolidation of the web to make a composite having compressed fibers locked therein by the thermoplastic resin. The compression consolidation results in the randomly oriented fibers exerting forces within the composite such that heating of the composite during thermostamping results in lofting of the fibers and expansion in the total thickness of the composite.

Suitable thermoplastics include, for example, aromatic polycarbonates such as bisphenol-A polycarbonates; polyamides such as polyamides derived from hexamethylene diamine and isophthalic acid; polyesters such as polyethylene terephthalate and polybutylene terephthalate; copolyetheresters; and polyolefin blends such as polyethylene or polypropylene blended with an acrylic resin or a polyamide. Other thermoplastic polymers and blends of thermoplastic polymers may also be useful. The preferred thermoplastic is polybutylene terephthalate.

The reinforcing fibers preferably are glass fibers having diameters from 5 to 30 microns and lengths of from 0.125 inches to 0.75 inches. The fibers may be individual fibers or fiber bundles. In addition to glass, the aromatic polyamides or other fiber forming inorganic materials or mixtures may be employed. The reinforcing fibers are preferably present at a level of from between 10 and 60 precent by weight of the composite, more preferably from 15 and 40 percent by weight thereof and more preferably about 25-30 percent by weight of the composite.

Suitable radio frequency energy sensitizing agents can be any of known sensitizers such as zinc oxide, bentonite clay, and N-ethyl toluene solfonamide. Suitable radio frequency energy sensitizing agents also include sensitizers for polycarbonate derived from disphenol A and phosgene, those sensitizers include polyamides such as nylon 6,6 and polyacrylics at levels of from 2 to 20 percent by weight based on the total weight of the composite. In general the sensitizer is present at from about 1 weight percent to about 20 weight percent based on the total weight of the composite, and preferably from 4 weight percent to 12 weight percent thereof.

The method of the present invention involves the steps of: (a) convection heating of the composite to the glass transition temperature of the thermoplastic; (b) radio frequency heating of the composite from the glass transition temperature of the thermoplastic to the stamping temperature, for example melt temperature of the thermoplastic; and (c) stamping of the composite into the desired shape.

The convection heating step can be accomplished by a conventional convection heating oven external from the thermostamping compression molding apparatus. The convection oven heats the composite to a temperature near the glass transition temperature of the thermoplastic matrix resin. The convection oven allows for the heating of the composite to the glass transition temperature of the resin fairly rapidly. By employing the convection heating step the composite is heated to the glass transition temperature of the resin much faster than radio frequency alone because radio frequency heating is less effective at temperatures below the glass transition temperature of the resin. The effectiveness of radio frequency heating tends to be a function of the mobility of the thermoplastic molecules and this is less effective at lower resin temperatures than at higher resin temperatures. In contrast, convection heating of non-woven radom fiber compression consolidated composites tends to be more effective at composite temperatures below the glass transition temperature of the resin because once the composite surface is sufficiently hot to allow the compressed fibers to loft, then the lofted fibers at the surface insulate the composite center and resist heating thereof resulting in a temperature gradient across the thickness of the composite which results in poor quality articles upon thermostamping of the composite. The convection heating step involves heating the composite from ambient temperature, for example room temperature (25° C.), to about the glass transition temperature of the thermoplastic material, preferably within 25° C. of the glass transition temperature (i.e. between 25° C. above and below the glass transition temperature of the resin), and more preferably within 10° C. of the glass transition temperature.

Once the composite is heated to about its glass transition temperature then the composite is heated further by radio frequency engergy to the thermostamping temperature of the composite. The thermostamping temperature of the composite is at or above the melt temperature of the resin when crystalline thermoplastics are the matrix resin and at or above the glass transition temperature plus about 150° C. when the matrix resin is an amorphous resin having no distinct melting point. For crystalline resins the thermostamping temperature is preferably between the melt temperature and 100° C. above the melt temperature, more preferably from 20° C. to 70° C. above the melt temperature, and most preferably about 50° C. above the melt temperature. For amorphous resins having no distinct melting point the thermostamping temperature is preferably between 150° C. above the glass transition temperature of the resin and 300° C. above the glass transition temperature of the resin, more preferably between 200° C. and 275° C. above the glass transition temperature, and most preferably about 250° C. above the glass transition temperature.

Once the composite is heated to its final thermostamping temperature then it is thermostamped into its desired shape article by placing the heated composite between two mold halves having temperatures of about 100° F. to 250° F. and is compressed under pressures of from 2,000 to 6,000 pounds per square inch. The final shaped parts of articles are useful as structural components in automotive applications, etc.

The radio frequency step can be accomplished by a radio frequency energy heating source external from the mold or may be heated by employing a pair of shuttling mold bases each having an RF electrode therein and placing the composite between a portable RF electrode and one of the mold bases and heating the composite, then removing the portable RF electrode, shuttling the base with the heated composite to a position below the thermostamping top mold halve, and thermostamping the composite while heating the next composite between the other mold half and the portable RF electrode. This shuttling process can be repeated in a step wise fashion.

What is claimed is:

1. A method for thermostamping non-woven fiber reinforced thermoplastic composites containing thermoplastic resin, compressed reinforcing fibers, and a radio frequency sensitizing agent, said method comprising the steps of:
   (a) convection heating of the composite to the glass transition of the thermoplastic resin;
   (b) radio frequency energy heating of the composite from the glass transition temperature of the resin to a stamping temperature between the melt temperature of the thermoplastic resin and 100° C. above the melt temperature of the thermoplastic resin; and
   (c) stamping said heated composite into a shaped article.

2. The method of claim 1 wherein said stamping temperature is between 20° C. above and 70° C. above the melt temperature of said resin.

3. A method for thermostamping non-woven thermoplastic composites containing thermoplastic resin, compressed reinforcing fibers and a radio frequency sensitizing agent, the method comprising:
   (a) convection heating of the composite to a final convection temperature between 25° C. below the glass transition temperature of the resin and 25° C. above the glass transition temperature of the resin;
   (b) radio frequency heating of the composite from the final convection temperature to a stamping temperature between the melt temperature of the thermoplastic resin and 100° C. above the melt temperature of the thermoplastic resin; and
   (c) stamping said heated composite into a shaped article.

4. The method of claim 3 wherein said stamping temperature is between 20° C. above and 70° C. above the melt temperature of the resin.

5. The method of claim 3 wherein said reinforcing fibers being present at a level of from between 10 and 60 percent by weight of said composite.

6. The method of claim 4 wherein said radio frequency sensitizing agent is present at a level of from between 1 and 20 percent by weight based on the composite.

7. A method for thermostamping non-woven thermoplastic composites containing thermoplastic resin, compressed reinforcing fibers and a radio frequency sensitizing agent, the method comprising:
   (a) convection heating of the composite to a final convection temperature between 25° C. below the glass transition temperature of the resin and 25° C. above the glass transition temperature of the resin;
   (b) radio frequency heating of the composite from the final convection temperature to a stamping temperature between 150° C. above the glass transition temperature of the resin and 300° C. above the glass transition temperature of the resin; and
   (c) stamping said heated composite into a shaped article.

8. The method of claim 4 wherein said reinforcing fibers being present at a level of from between 10 and 60 percent by weight of said composite.

9. The method of claim 8 wherein said radio frequency sensitizing agent is present at a level of from between 1 to 20 percent by weight based on the composite.

10. The method of claim 7 wherein said reinforcing fibers being present at a level of from between 10 and 60 percent by weight of said composite.

11. The method of claim 10 wherein said radio frequency sensitizing agent is present at a level of from between 1 and 20 percent by weight based on the composite.

* * * * *